(No Model.)
J. F. SHAY.
DEVICE FOR REMOVING WATER FROM GAS AND OTHER PIPES.
No. 385,378. Patented July 3, 1888.
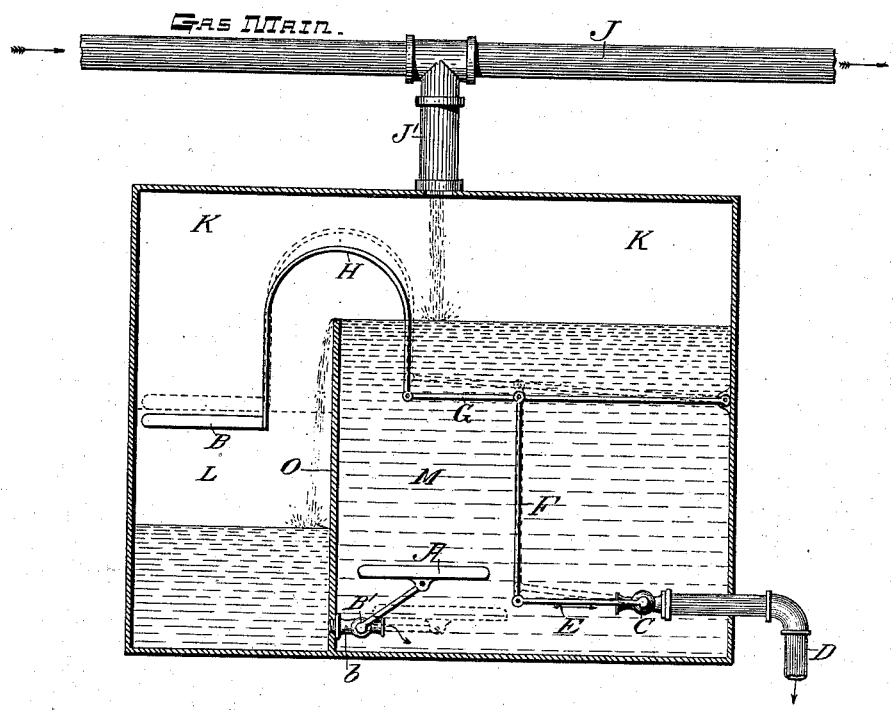

UNITED STATES PATENT OFFICE.

JAMES F. SHAY, OF TOLEDO, OHIO.

DEVICE FOR REMOVING WATER FROM GAS AND OTHER PIPES.

SPECIFICATION forming part of Letters Patent No. 385,378, dated July 3, 1888.

Application filed July 7, 1887. Serial No. 243,615. (No model.)

*To all whom it may concern:*

Be it known that I, JAMES F. SHAY, of Toledo, in the county of Lucas and State of Ohio, have invented a new and useful Improvement in Devices for Removing Water from Gas and other Pipes; and I do hereby declare the following to be a full, clear, and exact description thereof.

My invention has for its object to provide means for draining water from systems of pipe used in the distribution of gas or steam.

The labor and expense caused by the necessity for removing the aqueous condensation from gas-pipes has been very considerable. I have devised a new and improved device to be used for this purpose, and its merits are that it is automatic, simple in its action, cheap in construction, is not apt to get out of order, and that is does not afford means for the escape of gas or steam from the pipes.

I shall describe my invention with reference to the accompanying drawings, in which—

Figure 1 represents a vertical longitudinal section of my improved apparatus, shown in connection with a gas pipe or main; and Fig. 2 is a vertical sectional view of the float A or B detached.

In the drawings, J is the gas pipe or main, and J' is a water-outlet or branch extending down from the pipe J and opening into a tank, K, which is separated into two compartments, L and M, by a partition-wall, O, extending vertically from the bottom of the tank. The mouth of the pipe J is in the compartment M. At the base of the partition O is a short pipe, b, connecting the compartments L and M, and this pipe is controlled by a valve, B', whose projecting stem has at the end a float, A, within the compartment M. Near the base of the compartment M is a waste-pipe, D, which is provided at the inside with a valve, C. The stem E of this valve is connected by a system of levers, F, G, and H, with a float, B, which is within the compartment L near the level of the top of the partition O.

The operation of the apparatus is as follows: As the water collects in the gas-pipe it drips through the pipe J' into the compartment M of the tank K, and when it reaches the float A it raises it, and thereby closes the valve B'. The water then continues to accumulate in the compartment M until it reaches the level of the top of the partition O, when it flows over this partition into the compartment L. The water then continues to rise in the compartment L until it reaches the level of the float B, which it raises. The rise of this float moves the stem of the valve C and opens this valve, so as to afford an exit for the water in the chamber M. When the water has fallen in this chamber below the level of the float A, the dropping of the float opens the valve B' and causes the water in the chamber L to flow through the pipe b into the chamber M, thereby dropping the float B and closing the valve C. The apparatus is then in its original condition, and so remains until the water has risen again to the top of the partition O, when the same action takes place as I have just described. It will be noticed that the movement of the valve C is controlled, not by the height of the column of water in the chamber M, but by the height of water in the chamber L, so that when the valve is once opened the water in the chamber M will fall uninterruptedly until its level has reached the bottom, or until it falls far enough below the highest position of the float A to operate the discharge-valve of the chamber L. By reason of the fact that the position of the float A when up is preferably higher than the mouth of the pipe D and lower than the float B the water in the chamber M never falls below the level of the mouth of this pipe, so that no opening is afforded for the escape of gas or steam.

As shown in Fig. 2, the floats A and B are preferably made of hollow metal cases filled with a cake of compressed cork and soldered up. The cork in expanding fits tightly against the walls of the case and effectually prevents entrance of water into the float.

From the foregoing description it is apparent that the apparatus is reliable and altogether automatic in its action, that it is simple in the arrangement of its parts, and easy to construct. The water, instead of dripping out continuously, is flushed out at a single operation, and leaking of the gas is thus prevented.

The apparatus may be changed to a great degree in the arrangement of its parts. For example, the two floats, one of which causes and the other checks the water-discharge, may be differently situated.

I claim—

1. As a draining device for gas, steam, or other pipes, the combination of a fluid receptacle or tank, a discharge-valve controlling it, a secondary fluid-receiving chamber or receptacle, and a float situated within this secondary chamber and controlling the discharge-valve, substantially as and for the purposes described.

2. As a draining device for gas, steam, or other pipes, the combination, with the tank having two compartments or chambers, L and M, connected by an overflow, of a discharge pipe and valve in one chamber, M, a float in the other chamber, L, controlling the valve of the chamber M, and a discharge-valve from the chamber L, which valve is opened by the fall of water in the chamber M, substantially as and for the purposes described.

In testimony whereof I have hereunto set my hand this 28th day of June, A. D. 1887.

JAMES F. SHAY.

Witnesses:
R. S. JANNEY,
J. J. SUMNER.